July 21, 1925.  
J. W. KOHLHEPP  
HOG DEHAIRING MACHINE  
Filed Nov. 3, 1924  
1,546,388  
3 Sheets-Sheet 3
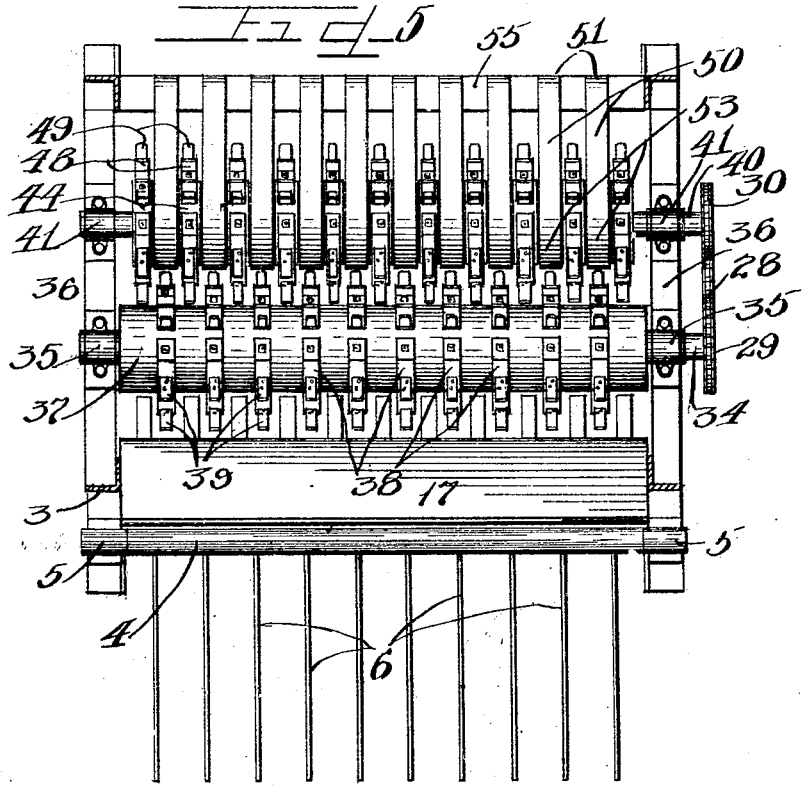
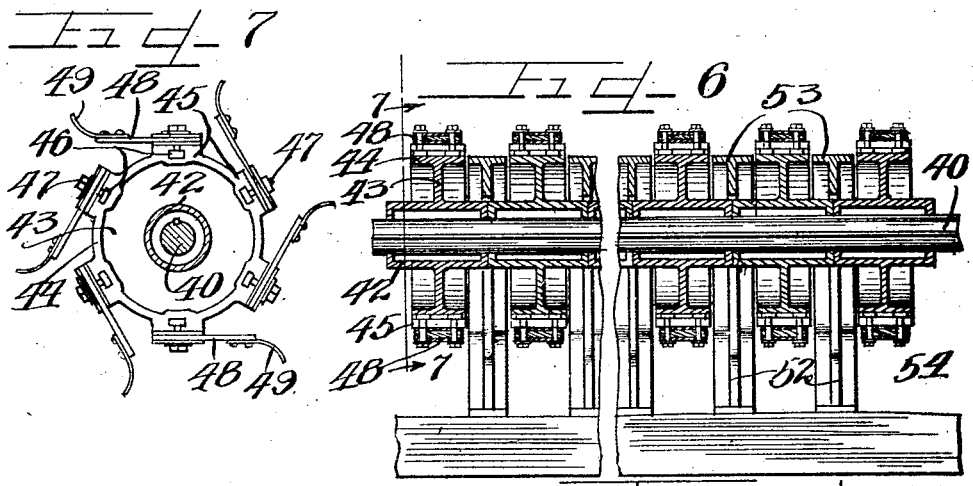

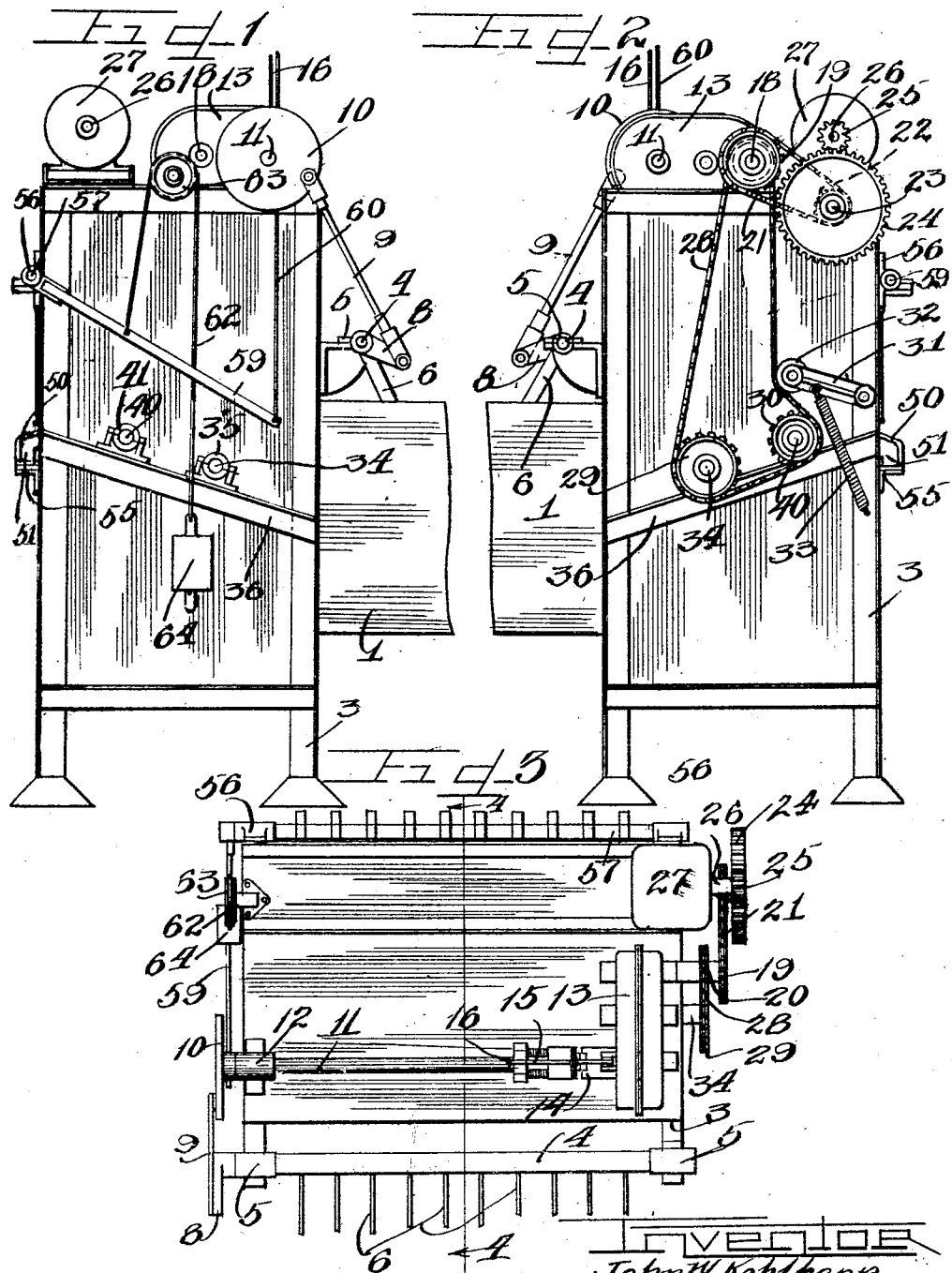

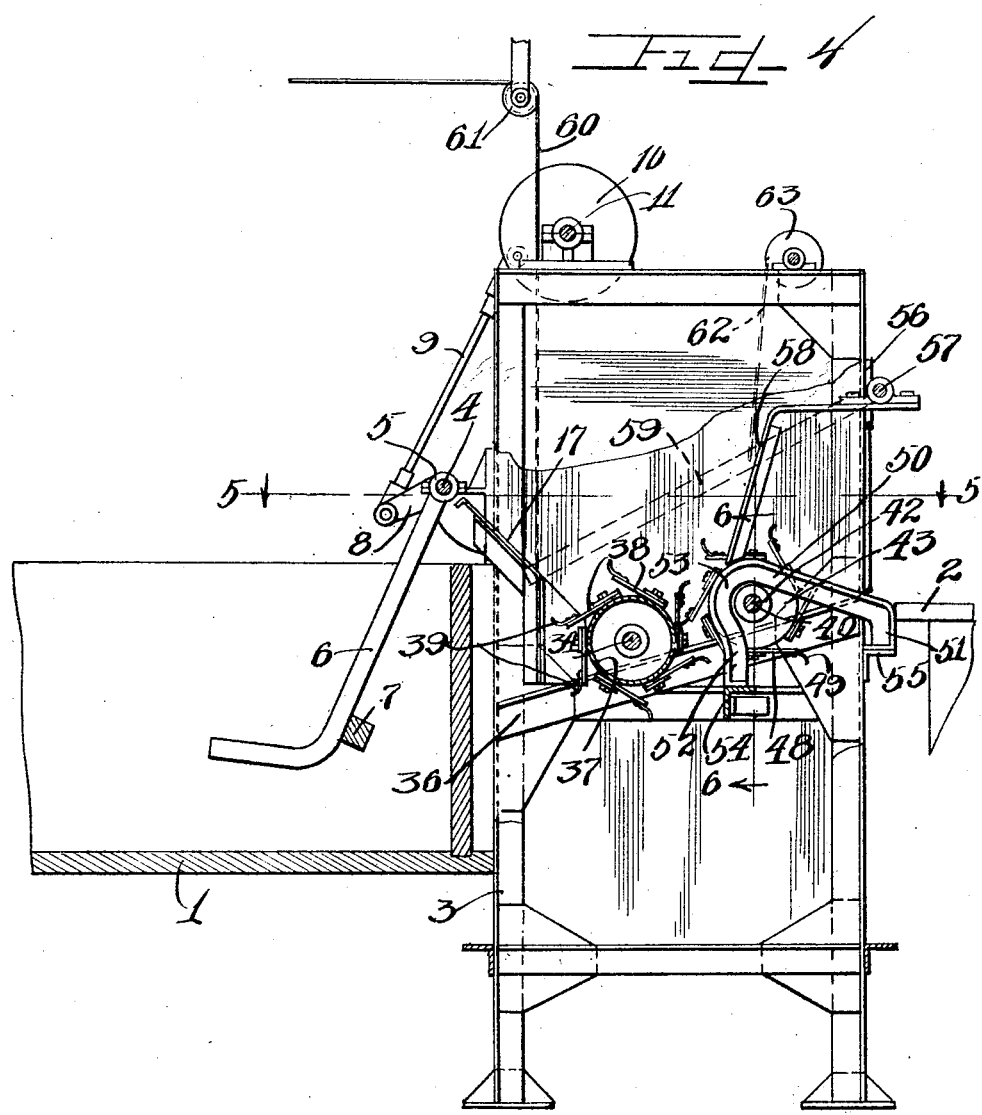

Patented July 21, 1925.

1,546,388

UNITED STATES PATENT OFFICE.

JOHN W. KOHLHEPP, OF CHICAGO, ILLINOIS, ASSIGNOR TO THE ALLBRIGHT-NELL COMPANY, OF CHICAGO, ILLINOIS, A CORPORATION OF ILLINOIS.

HOG-DEHAIRING MACHINE.

Application filed November 3, 1924. Serial No. 747,509.

*To all whom it may concern:*

Be it known that I, JOHN W. KOHLHEPP, a citizen of the United States, and a resident of the city of Chicago, in the county of Cook and State of Illinois, have invented certain new and useful Improvements in a Hog-Dehairing Machine; and I hereby declare that the following is a full, clear, and exact description of the same, reference being had to the accompanying drawings, and to the numerals of reference marked thereon, which form a part of this specification.

This invention relates more particularly to a hog dehairing machine of simple and effective construction adapted to receive hogs from a scalding tank or vat and cause rotation of the hogs about one another within the field of operation of a plurality of rotating beater drums or logs which serve to dehair the hogs after which a discharge rack is moved into a position to permit the beater logs to discharge the dehaired hogs over stationary rack bars which are positioned between the rotatable beater units comprising the upper log of the dehairing unit.

It is an object of this invention to provide an improved hog dehairing unit adapted to conveniently receive one or more hogs to remove the hair therefrom by a plurality of rotatable beater logs one of which has the rotatable beater units positioned on opposite sides of a plurality of stationary discharge bracket bars which lead out of the machine.

It is also an object of this invention to provide a carcass dehairing unit wherein the discharge rack bars are stationary and are positioned to separate the beater wheel units which comprise the upper log of the machine.

It is a further object of this invention to provide a carcass dehairing machine with means for delivering carcasses from a scalding tank onto an inlet apron from which the carcasses are permitted to fall into the field of a plurality of rotatable beater logs positioned at different elevations and adapted to cause discharge of the carcasses after the same have been cleaned by swinging a control rack into an elevated position out of the path of the advancing carcasses.

It is furthermore an object of this invention to provide an improved carcass dehairing unit wherein one of the beater logs is constructed to coact with a plurality of stationary rack members which are positioned to separate the beater units of said log.

Another object of the invention is to provide a carcass dehairing machine wherein one of the beater logs is so constructed that the beater arms of the beater elements comprising the log are positioned to rotate between the bars of a movable carcass outlet control rack and the stationary bars or frame members constituting a stationary outlet rack over which the carcasses are adapted to pass.

It is an important object of this invention to provide an improved, compact and simple carcass dehairing unit adapted to be conveniently used between a carcass scalding tank and a carcass receiving table, said machine having manually controlled mechanisms for governing the feeding of carcasses into the machine and the discharging of the carcasses therefrom after the carcasses have been thoroughly cleaned and dehaired by the action of a plurality of rotatable beater logs positioned at different elevations with the beater arms of one of said logs adapted to pass between the bars comprising a movable discharge rack and a stationary discharge rack.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a carcass dehairing machine embodying the principles of this invention.

Figure 2 is a side elevation of the opposite side of the machine illustrating the driving gear mechanisms.

Figure 3 is a top plan view of the machine.

Figure 4 is an enlarged vertical sectional view taken on line 4—4 of Figure 3 illustrating a portion of the scalding tank and a carcass receiving table.

Figure 5 is an enlarged sectional plan view taken on line 5—5 of Figure 4.

Figure 6 is an enlarged fragmentary detailed section of the upper beater log taken on line 6—6 of Figure 4.

Figure 7 is a detail section taken on line 7—7 of Figure 6.

As shown on the drawings:

The reference numeral 1 indicates a scalding tank or vat which is disposed at the entrance end of a carcass dehairing machine embodying the principles of this invention. Positioned adjacent the discharge end of the machine is a carcass receiving table or platform 2. The scalding tank 1 and the table 2 may be of any desired construction and form no part of the present invention which relates primarily to the carcass dehairing machine per se.

The hog or carcass dehairing machine comprises a frame 3 having a transverse shaft 4 positioned across the entrance end thereof with the ends of said shaft journalled in suitable bearings 5 supported on the machine frame. Rigidly secured to the shaft 4 are a plurality of spaced arms or tines 6 the ends of which are bent at an angle as indicated in Figure 4. The arms 6 together with the shaft 4 form a carcass lifting or feeding cradle which in its lowered position projects into the scalding tank 1 and is adapted to contact a stop bar 7. Connected to one end of the shaft 4 is a crank arm 8 to the outer end of which one end of a connecting rod 9 is pivotally connected. The other end of the connecting rod 9 is pivoted eccentrically on a disc 10. The disc 10 is secured on one end of a transverse shaft 11 which is supported across the top of the machine frame in a bearing 12 and in a gear reduction housing 13. The housing 13 contains suitable reduction gears which are connected up with the control shaft 11 through a clutch mechanism 14 adapted to be operated by a clutch lever 15 by means of a rope or cable 16 located in a suitable place for the convenience of an operator. By manually pulling on the rope 16 the lever 15 is operated to throw in the clutch so that a drive from the reduction gears in the housing 13 is transmitted to the shaft 11 to cause rotation of the disc 10 whereby the connecting rod 9 and the crank 8 are actuated to cause the cradle 6 to swing upwardly thereby lifting a carcass from the scalding tank 1 and depositing the carcass upon an inclined carcass receiving apron or table 17 which is mounted in the entrance end of the machine frame 3 as illustrated in Figure 4. Journalled in the gear reduction housing 13 is a transverse shaft 18 having a sprocket 19 secured on the outer projecting end thereof. Also mounted on the shaft 18 between the sprocket 19 and the machine frame is a sprocket 20. Trained around the sprocket 19 is an endless chain 21 which is also trained around a small sprocket 22 secured on a shaft 23 supported on one side of the machine frame. Also secured on the outer end of the shaft 23 is a large gear 24 which is in mesh with a driving pinion 25 mounted on the end of a motor shaft 26 forming a part of a driving motor 27. The motor 27 is mounted upon the top of the machine frame. Trained around the sprocket 20 is an endless driving chain 28 which is trained around a large sprocket 29 and around a smaller sprocket 30 as illustrated in Figure 2. Pivoted on one side of the machine frame 3 is an arm 31 having a roller 32 rotatably mounted on the free end thereof and held in contact with one lap of the endless chain 28 to take up slack in said chain. Attached to the pivoted arm 31 near the roller is one end of a coiled spring 33 the lower end of which is secured to the machine frame 3 (Figure 3). The sprocket 29 is mounted on the outer end of a lower beater drum shaft 34 the ends of which are journalled in suitable bearings 35 supported on inclined angle bars 36 mounted within the machine frame 3.

Supported on the lower shaft 34 within the machine frame 3 is a lower beater drum or log 37 of cylindrical form having a plurality of flexible beater arms 38 secured in circular relation on the periphery thereof to form a beater wheel unit. As illustrated in Figure 5 the drum 37 has a plurality of beater wheel units secured thereon in spaced relation with each wheel unit comprising a plurality of flexible beater arms mounted tangentially upon the peripheral surface of the beater drum 37 with each of said arms having secured on the outer end of the beating surface thereof beater blades 39.

The sprocket 30 is mounted on the outer end of an upper beater drum shaft 40 which is journalled in suitable bearings 41 which are also mounted upon the inclined supporting bars 36 at a higher elevation than the bearings 35. Mounted on the upper beater shaft 40 is an upper beater drum or log of improved construction comprising a plurality of adjacently positioned beater wheel units are spaced in staggered relation with respect to the beater wheel units on the lower beater drum 37 as illustrated in Figure 5. Each of the upper beater wheel units comprises a cylindrical hub section 42 which is keyed upon the shaft 40. Integrally formed radially on the middle portion of the hub 42 is a disc wheel 43 which supports an integral rim 44. Integrally formed on the rim 44 are a plurality of equidistantly spaced bosses 45 having T-slots 46 therein for the reception of mounting bolts 47. Secured to each one of the bosses 45 by means of the bolts 47 is a tangentially directed flexible beater arm 48 having a beater blade 49 mounted on the end thereof. As illustrated in Figure 6 the upper beater drum or log comprises a plurality of beater wheel units of the type illustrated in Figure 7 with the hubs 42 of said beater wheel units secured on the upper beater shaft 40 with the ends of said hubs abutting one another. The hubs 42 are longer than the width of the beater wheels to hold the beater wheel rims 44 spaced apart.

Mounted within the machine frame 3 and projecting therefrom are a plurality of discharge rack bars each of which comprises a T-cross sectioned inclined arm 50 having a short leg 51 formed on the outer end thereof and a long arm 52 formed on the inner end thereof and curved at 53 to engage around and over the abutting hub portions 42 of the upper beater wheel units. The long arms 52 of the rack bars are secured on a transverse brace member 54 secured to the machine frame. The short outer legs 51 of the rack bars are secured to an angle bracket 55 mounted transversely across the discharge end of the machine. It will thus be noted that the beater wheel units of the upper beater drum or log are adapted to rotate between the stationary discharge rack bars 50 while the lower beater wheel units on the drum 37 are adapted to rotate between the upper beater wheel units and in the planes of said discharge rack bars as illustrated in Figure 5. The upper beater drum or log is adapted to rotate at a greater rate of speed than the lower beater drum or log due to the difference in the size of the sprockets 29 and 30 on the beater drum shafts.

Supported in suitable bearings 56 secured near the upper portion of the discharge end of the machine frame is a shaft 57 to which a plurality of bent arms 58 are secured. The arms 58 project horizontally into the machine frame with the inner ends of said arms bent downwardly at an angle as illustrated in Figure 4. The arms 58 afford a carcass controlling discharge rack adapted to be operated when the shaft 57 is rotated. Secured to one end of the shaft 57 is an arm or control lever 59 to the outer end of which one end of an actuating cord or cable 60 is attached. The cable 60 passes over a guide pulley 61 (Figure 4) and is positioned in a convenient place easily accessible by the operator. Also attached to the lever 59 intermediate its ends is one end of a rope or cord 62 which passes over a guide pulley 63 supported on the top of the machine frame. Attached to the other end of the cord 62 is a weight 64 for the purpose of counter-balancing the weight of the discharge rack 58 to hold the same in an open position after the discharge rack has been raised by pulling on the cable 60 to swing the lever 59 upwardly.

The operation is as follows:

Carcasses to be dehaired are delivered into the scalding tank or vat 1 and when properly scalded are pushed into the cradle 6. The operator by pulling on the cord 16 is adapted to actuate the control lever 15 thereby throwing in the clutch 14 to cause a drive from the motor 27 to be transmitted through the speed reduction gears in the housing 13 to the shaft 11. Rotation of the shaft causes rotation of the disc 10 and operation of the connecting rod 9 and the crank arm 8 thereby causing the cradle to swing upwardly lifting the carcasses out of the scalding tank into a position wherein said carcasses are permitted to roll or slide off of the cradle onto the receiving apron 17. From the apron 17 the carcasses are permitted to fall into the machine disposed within the field of operation of the lowermost beater drum. When the motor 27 is operating a drive from said motor is transmitted through the gears, chains and sprockets to the shafts 34 and 40 causing said shafts to rotate at different rates of speed depending upon the size of the sprockets 29 and 30. The lower beater drum mechanism is rotated at a slower rate of speed than the upper beater drum or log. When carcasses are delivered into the machine over the entrance apron 17 the carcasses are engaged by the beater arms on the rotating lower beater drum with said arms acting to carry the carcasses upwardly into a position between the lower beater and the upper beater drums so that the beater arm mechanisms of both of the drums act on the carcasses to rotate and dehair the same. The movable discharge rack 58 is in its lowered position as illustrated in Figure 4 when carcasses are undergoing a dehairing process, said rack serving as a means for preventing discharge of the carcasses from the machine. It will thus be noted that carcasses may be delivered into the machine at the will of the operator by pulling on the cord 16 causing a drive to be transmitted to the eccentric disc 10 which controls the operation of the cradle 6. The carcasses delivered into the machine are rotated by the action of the beater drum mechanisms and act on one another also, whereby the carcasses are completely and efficiently dehaired and cleaned. When the carcasses have been cleaned the operator pulls on the cable 60 thereby swinging the control lever upwardly, thereby causing the movable discharge rack 58 to be swung upwardly within the machine into an out of the way position thereby permitting the rotating beater drum mechanisms to engage the carcasses and advance the same over the upper beater drum or log onto the stationary discharge rack 50. The cleaned and dehaired carcasses are thus permitted to slide off of the rack 50 and onto the gambreling table 2 from which the dehaired carcasses may be removed as desired. The control weight 64 connected with the lever 59 acts to serve as a means for holding the discharge rack 58 in its elevated position during the time carcasses are being discharged from the machine.

Particular attention is directed to the novel construction of applicant's machine wherein both a stationary discharge rack and a movable discharge rack are positioned to coact with the upper beater drum mechanism or log, the beater arms of which are permitted to pass between the members forming the stationary rack and the movable rack.

From the description and illustrations it it will be seen that a compact carcass dehairing unit is afforded by the improved invention, said unit having the carcass beater drums or dehairing logs supported at different elevations with said beater drums and the entrance apron 17 and the movable discharge rack 58 affording a pocket or chamber (Figure 4) so that the carcasses delivered into the machine are not only rotated by the flexible beater arms of the beater drum mechanisms but also act on one another to aid in the cleaning and dehairing operation. Carcasses may be delivered into the machine and discharged therefrom at the will of an operator who is positioned in a convenient place from which he has ready access to the control cords or cables 16 and 60.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a carcass dehairing machine of the class described the combination with a stationary rack, of a movable rack adapted to contact the same to form a stop for carcasses, and a beater mechanism having beater members adapted to simultaneously pass through both the stationary and movable racks.

2. In a carcass dehairing machine of the class described the combination with a stationary rack, of a beater mechanism co-acting therewith, a stationary support for said beater mechanism, and a movable rack adapted to rest on said stationary rack in a position to permit the beater mechanism to act therethrough.

3. A carcass dehairing machine comprising a housing, an inclined entrance apron within said housing, a movable inclined discharge rack within said housing, a plurality of beater drum mechanisms mounted within said housing, means for driving the same at different speeds, a mechanism on said machine for delivering carcasses onto said inclined apron for delivery into the field of operation of said beater drum mechanisms, and manually controlled means for operating said movable rack to move said rack into a position wherein the beater drum mechanisms are permitted to discharge the carcasses from the machine over one of said beater drum mechanisms.

4. A carcass dehairing machine comprising a housing, a lower beater drum mechanism mounted therein, an upper beater drum mechanism also supported within the housing, and movable and stationary racks mounted within the housing and interfitting with said upper beater drum mechanism.

5. A carcass dehairing machine comprising a housing, means for delivering carcasses into the housing, beater drum mechanisms mounted in said housing at different elevations, means for driving said beater drum mechanisms at different speeds, a stationary discharge rack, interfitting with said upper beater drum mechanism, and a control rack in said housing interfitting with said upper beater drum mechanism adapted to be moved into a position to permit the beater drum mechanisms to discharge the carcasses over the upper beater drum mechanism onto said stationary discharge rack for delivery from the machine.

6. A carcass dehairing unit comprising a frame, a stationary rack rigidly supported thereon, a beater drum supported on said frame, a stationary support therefor, beater arms mounted on said drum adapted to move through said stationary rack, and a movable rack positioned above said beater drum mechanisms constructed to permit the beater arms to pass therethrough.

7. The combination with a carcass dehairing machine, of a stationary rack comprising a plurality of spaced frame members, a movable rack adapted when in closed position to contact said stationary rack, a rotatable beater shaft forming a part of said machine, and dehairing units secured adjacent one another on said shaft between said stationary frame members and the members forming the movable rack.

8. In a carcass dehairing machine, the combination with a frame, of a stationary rack comprising a plurality of spaced parallel rack members, a shaft rotatably supported on said frame, beater wheel units secured on said shaft in contacting relation and projecting between said rack members, and a movable rack supported on said frame comprising a plurality of rack arms positioned to permit the same beater wheel units to simultaneously pass between the stationary and movable rack members when the beater wheel units are rotating.

9. A carcass dehairing machine comprising a frame, stationary inclined supports therein, a lower carcass dehairing drum supported on said inclined supports, a shaft also rotatably supported on said inclined supports at a higher elevation than said lower beater drum mechanism, a plurality of rack members supported on the frame shaped to permit said shaft to project transversely therethrough, beater wheel units secured on said shaft to operate between said rack members, a plurality of movable rack members supported on said frame and positioned to permit said beater wheel units to pass therebetween, and means for simultaneously moving said movable rack members into a position to permit the beater wheel units to discharge carcasses over said stationary rack members.

10. In a carcass dehairing machine the combination with a lower beater drum, of beater arms supported thereon, an upper beater drum, a stationary rack interfitting with the same, beater arm mechanisms on said beater drum adapted to be moved through said rack, chain and sprocket means connected with said lower and upper beater drums for rotating the same at different speeds, and a driving mechanism for operating said chain and sprocket means.

11. A carcass dehairing machine comprising a housing, upper and lower beater drums mounted therein in an inclined plane, a stationary discharge rack interfitting with one of said beater drums, a movable rack also interfitting with said same beater drum, said stationary discharge rack serving as a stop for said movable rack, means for delivering carcasses to be dehaired into the field of operation of said lower and upper beater drums with said movable rack positioned to hold the carcasses against moving out of the field of operation of said beater drums, and manually controlled means for moving said movable rack into a position to permit the beater drums to discharge the dehaired carcasses from the machine over said stationary rack.

12. A carcass dehairing machine comprising a housing, stationary beater drum mechanisms rotatably supported therein in an inclined plane, an inclined apron in said housing, an inclined movable discharge control rack also mounted in said housing, a stationary rack acting as a stop for said movable rack, means for delivering carcasses into the housing over said inclined apron and above said beater drum mechanisms, means for operating said beater drum mechanism to cause the same to act on the carcasses to rotate and dehair the same and also cause the carcasses to act on one another to assist in the dehairing operations, and means for moving the movable discharge rack inwardly into a position to permit the beater drum mechanisms to discharge the carcasses from the housing over said beater drum mechanisms and beneath said movable discharge rack.

13. In a carcass dehairing machine comprising a housing, a beater drum mechanism rotatably mounted at different elevations, and contacting stationary and movable racks mounted in said housing and interfitting with only one of said beater drum mechanisms.

14. In a carcass dehairing machine of the class described the combination with a stationary discharge rack comprising a plurality of parallel spaced members, of a shaft mounted to project through said rack members, a plurality of abutting hubs secured on said shaft, beater wheels integrally formed on said hubs and projecting between said rack members, beater arms removably secured to said beater wheels, and beater blades secured on said beater arms.

15. In a carcass dehairing machine of the class described the combination with a rotatable shaft, of a plurality of abutting hubs secured thereon, wheels integrally formed on said hubs of less width than the length of said hubs, beater arms removably secured to the periphery of said wheels, and beater blades on said arms.

16. In a carcass dehairing machine the combination with a shaft of hub mechanisms mounted thereon, a plurality of wheels on said hub mechanisms with said wheels spaced from one another, beater mechanisms on said wheels, and a plurality of curved stationary rack members mounted to project over said hub mechanisms between the said spaced wheels with said shaft projecting through the bights of said curved stationary rack members.

17. In a carcass dehairing machine the combination with a stationary rack and a movable rack, of beater mechanisms, and means for moving said movable rack into engagement with said stationary rack to afford a stop to hold carcasses in the field of operation of said beater mechanisms.

In testimony whereof I have hereunto subscribed my name in the presence of two subscribing witnesses.

JOHN W. KOHLHEPP.

Witnesses:
W. B. ALLBRIGHT,
J. G. ALLBRIGHT.